United States Patent [19]

Külzer et al.

[11] 4,114,899
[45] Sep. 19, 1978

[54] COOLED MECHANICAL SEAL

[76] Inventors: Friedhelm Külzer, D-6520 Worms 26; Ehrhard Mayer, D-8191 Eurasburg, both of Fed. Rep. of Germany

[21] Appl. No.: 549,550

[22] Filed: Feb. 13, 1975

[30] Foreign Application Priority Data

Feb. 22, 1974 [DE] Fed. Rep. of Germany ....... 2408660

[51] Int. Cl.² ............................................. F16J 15/34
[52] U.S. Cl. ...................................... 277/22; 277/85; 277/93 SD; 415/177
[58] Field of Search ................... 277/22, 85, 74, 93 R, 277/93 SD, 133, 93; 415/180, 177, 9

[56] References Cited

U.S. PATENT DOCUMENTS

| | | | |
|---|---|---|---|
| 1,657,349 | 1/1928 | Eisenhauer | 277/133 |
| 2,628,852 | 2/1953 | Voytech | 277/22 |
| 2,859,054 | 11/1958 | Willi | 277/74 |
| 3,031,197 | 4/1962 | Wilkinson | 277/74 |
| 3,340,813 | 9/1967 | Keyes | 415/176 |
| 3,542,496 | 11/1970 | Bergeson et al. | 415/109 |
| 3,608,910 | 9/1971 | Tyler | 277/22 |
| 3,770,179 | 11/1973 | McHugh | 277/2 |
| 3,940,150 | 2/1976 | Martin et al. | 277/22 |

Primary Examiner—Richard E. Aegerter
Assistant Examiner—L. Footland
Attorney, Agent, or Firm—Jerry Cohen

[57] ABSTRACT

The external heat transfer loop of a slide ring/counter ring type seal is eliminated by provision in the seal structure of a mounting subassembly which comprises a fixed housing block, of one-piece or multi-piece form, holding the counter ring is axially fixed position and having circumferential and end face extended surfaces, such as ribs, for heat dissipation to ambient air. The mounting block has smooth surfaces in metallic contact with corresponding smooth surfaces on a back face and on a peripheral face of the counter ring with at least one-third of the total surface area of the counter ring being so contacted. The counter ring has a front step overlapped by a gasket and holding a collar extension of the mounting block.

4 Claims, 3 Drawing Figures

COOLED MECHANICAL SEAL

BACKGROUND OF THE INVENTION

The invention concerns a cooled mechanical seal with a slide ring rotating with the shaft and a counter ring, non-rotatably mounted in the sealing housing.

The medium to be sealed is itself used to carry away the frictional heat of the slide ring and counter ring in known seals of this type. If the medium is unsuited for such cooling purposes by virtue of its nature or high temperature, a cooling system is provided which conducts a coolant over the slide ring and counter ring, said coolant carrying away the frictional heat and/or the heat given off from the medium to be sealed to the rings. For this purpose, in known sealing methods, the coolant is fed through an external heat exchanger by means of a special pump or by the thermosiphon effect and through the sealing housing in the circuit, or, when the seal is used for pumps, a portion of the output flow is tapped on the high-pressure side, cooled in a heat exchanger and fed into the sealing housing, whence it flows to the low-pressure side of the pump to be sealed.

The heat exchanger, mounted separately from the seal, and with which filters, separators and shutoff valves are associated in addition to the necessary connecting pipes, complicate the incorporation of the mechanical seal and in the event of incorect attendance can lead to inability of the seal to function. For this reason separately mounted heat exchangers should not be used with such mechanical seals, which are installed in so-called "Usus" pumps (in German: *unabhängige Sicherheitsund Sabotagepumpen* = (independent safety and sabotage pumps), which are provided for emergency purposes in nuclear power plants.

SUMMARY OF THE INVENTION

The object of the invention is to create a cooled mechanical seal which requires no separately mounted assemblies, particularly a heat exchanger, for reliable function, even under difficult operating conditions, i.e., high temperature of the medium to be sealed and/or high rubbing speed.

This object is achieved according to the invention with a cooled mechanical seal of the type mentioned initially by a combination of means, such that the counter ring facing the medium to be sealed is mounted so as to be axially nondisplaceable in the sealing housing and has essentially its entire end seal face, and/or its circumference in metallic contact against the housing seat, and that the outside of the sealing housing, which communicates with the free atmosphere, is provided with cooling ribs.

This design makes it possible to transmit the frictional heat of the rings and also the heat transmitted from the medium to be sealed to the rings with low heat resistance to the sealing housing and to transfer the heat from the sealing housing to the free atmosphere, so that the slide ring and counter ring can be maintained at a temperature which is sufficiently low for reliability.

In order to increase the cooling effect, a fan wheel can be fastened to the shaft to be sealed, with the cooling rib mounted in the air stream from said fan wheel. Instead of this fan wheel (or in addition thereto), an air conduit tube which surrounds the cooling ribs at least partially can be linked via a pipe to the cooling air system of the electric motor driving the shaft to be sealed or a generator driven by said shaft.

A particularly advantageous arrangement is one in which the counter ring has its working surface facing the space to be sealed and has its outer circumference facing the medium ro be sealed. In this arrangement the seat of the counter ring can be mounted in a portion of the sealing housing which is in a considerable distance from the space containing the medium to be sealed and presents a large area to the free atmosphere, so that more heat can be given off to the latter.

For protection against the hat medium to be sealed, supply restricting device is mounted preferably between the space to be sealed and the sealing gap of the slide ring and counter ring, said supply restricting device fitting around the shaft with a slight amount of play. This prevents the medium to be sealed from circulating inside the sealing housing and heating the sealing ring and counter ring additionally.

These and other objects, features and advantages of the invention will be apparent from the following detailed description with reference therein to the accompanying drawing in which:

DETAILED DESCRIPTION OF THE PREFERRED EMBODIMENTS

Figure 1:
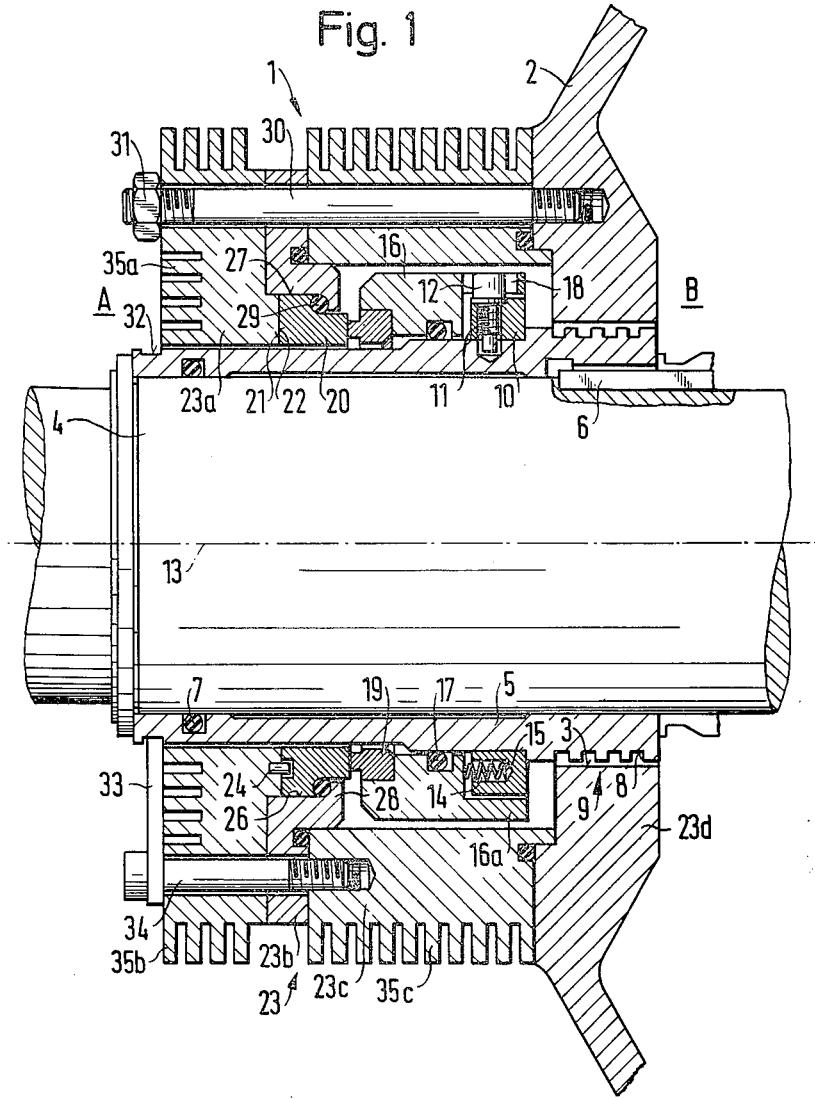
FIG. 1 is a vertical section in the central lengthwise plane of a first embodiment of the mechanical according to the invention.

The mechanical seal shown in FIG. 1 and represented in its entirety by 1, is mounted on a partition 2, on the side facing the free atmosphere A, said partition delimiting a space B containing the medium to be sealed and with the shaft 4 to be sealed passing through an opening 3 in said partition.

Partition 2 is made such that the wall thickness is greater in the vicinity of opening 3. A shaft sleeve 5 is mounted on shaft 4 by suitable means so that it is axially nondisplaceable and prevented from rotating by a key 6 and sealed off from the shaft by an O-ring 7. The shaft sleeve 5, located in the opening with minimum radial play and provided in this portion of its length with annular grooves 8, projects in the direction of the free atmosphere A. The slight radial play between opening 3 and shaft sleeve 5, together with the annular grooves 8 which increase the flow resistance but are not mutually ccnnected, creates a supply restricting device 9 which ensures that it is essentially only an amount of medium to be sealed equal to the leakage rate of the mechanical seal is feed from space B into the interior of the mechanical seal.

In the vicinity of partition 2 a retaining ring 10 is fastened to shaft sleeve 5 by means of a screw 11, the head 12 of said screw projecting radially beyond the retaining ring. Retaining ring 10 has blind holes 14 distributed around its circumference and parallel to the shaft axis 13, said blind holes containing coil springs 15. The other ends of these coil springs 15 press against a carrier sleeve 16 which is mounted so that it is axially displaceable on the shaft sleeve and is sealed off from the latter by means of an O-ring 17. At one end, carrier sleeve 16 has a collar 16a which overlaps retaining ring 10, said collar receiving head 12 of locking screw 11 in an axially parellel slot 18, thereby preventing rotation, while a slide ring 19 is mounted at the other end.

The front face working surface of slide ring 19 is pressed against a front face of a stationary counter ring 20 by the action of coil springs 15. The back face 21 of said counter ring, away from slide ring 19 and extending in an plane radial with respect to shaft axis 13, rests against a seat 22 provided in a mounting block portion of a multi-piece housing 23. A lid flange component 23a of housing 23 has a smooth front face defining seat 22. A pin 24, located axially parallel in holes of back face 21 and seat 22, prevents rotation of counter ring 20. In the radial direction, counter ring 20 is held by a clamping flange component 23b of housing 23, which has a smooth cylindrical seat 26 matching a smooth outer circumferential surface 27 of counter ring 20. A collar 28 on clamping flange 23b, projecting radially towards the interior, rests through the intermediary of an O-ring gasket 29 against the annular shoulder defined by a front step of counter ring 20 so that the counter ring is sealed off and pressed against its seat 22 by a constant tension.

Lid flange 23a is connected to partition 2 through the intermediary of clamping flange 23b and a tubular section 23c of housing 23 by means of studs 30 with nuts 31, distributed around the circumference and parallel to shaft axis 13. The area 23d of partition 2 surrounding opening 3 is forming a part of the sealing housing. The back face 21 and the circumferential surface 27 of counter ring 20, as well as the seat 22 of lid flange 23a and the cylindrical seat 26 of clamping flange 23b are carefully finished, so that satisfactory heat transmission is ensured from counter ring 20 to lid flange 23c and to tubular section 23c via clamping flange 23b. The carrier sleeve 16 is mounted inside tubular section 23c with radial play. A strip 33 fitting into annular groove 32 of shaft sleeve 5, is held in place by a screw 34, screwed into the tubular section 23c of the housing 23. Strip 33 and screw 34 serve only to hold the mechanical seal together for preassembly stages and are removed during operation.

In order to carry off the heat produced by the friction of slide ring 19 on counter ring 20 and the heat which penetrates with the medium to be sealed from space B, at least two third and preferably essentially the entire outer surface of sealing housing 23 is provided with cooling ribs. A first portion 35a of the cooling rib is in the form of rings on the end of the lid flange 23a, concentric with respect to shaft axis 13. On the outer circumference of this lid flange and on the tubular housing section 23c there are further groups 35b, 35c of cooling ribs in the form of rings which lie in planes perpendicular to shaft axis 13.

Figure 2:
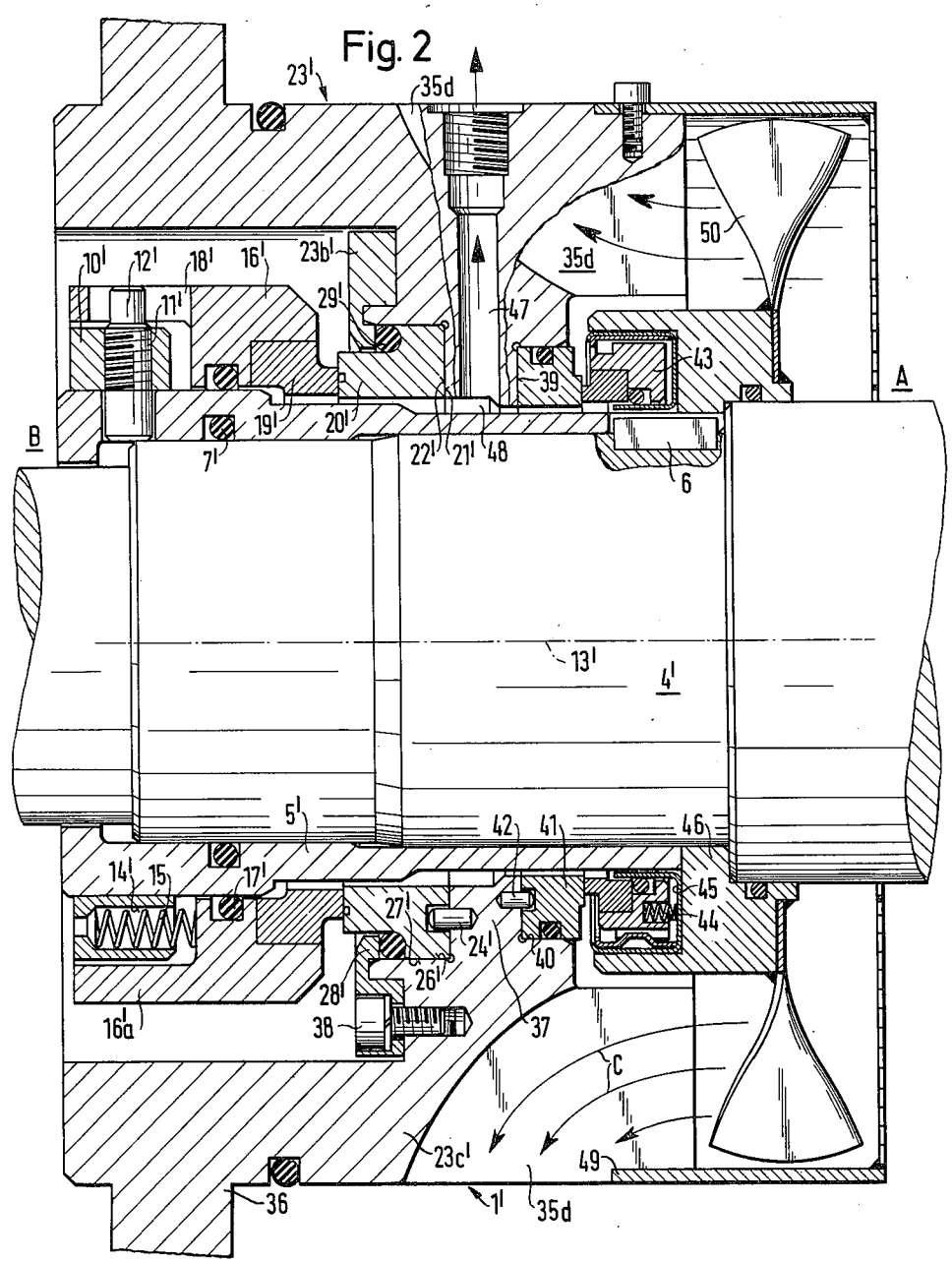
FIG. 2 is a section corresponding to FIG. 1 in a second embodiment of the invention.

In FIG. 2, which shows a second embodiment of the invention, the components which are similarly designed and perform a comparable function to that in FIG. 1 are marked with the same reference numbers, with prime symbols added. Sealing housing 23' is attached to a partition (not shown) by means of a flange 36, shown only as cut away, said partition separating a space B containing the medium to be sealed, from the free atmosphere A. The tubular housing section 23c' has a central annular rib 37, projecting radially inward, in which the end seat 22' and the cylindrical seat 26' are provided for the stationary counter ring 20. The clamping flange 23b' is located inside the tubular housing section 23c' and attached to annular rib 37 means of several screws 38 distributed around the circumference. Counter ring 20', together with slide ring 19', forms a primary seal, i.e., the seal which is subjected to the pressure of the medium to be sealed off.

Another end seal 39 and cylindrical seat 40 are provided on the axially opposite side of annular rib 37, with a counter ring 41, forming part of a secondary seal, being immovably mounted in said seats and prevented from rotating by a pin 42. A slide ring 43, subjected to tension from coil springs 44, rests against the working surface of this secondary counter ring 41; the other ends of coil springs 44 press against the bottom of a housing 45 which in turn is mounted in a carrier ring 46 attached to shaft 4'.

A hole 47 runs through annular rib 37, connecting a safety exhaust (not shown) to a space 48 between the primary and secondary seals.

Stellate projecting cooling ribs 35d, which extend primarily in planes contained in shaft axis 13', are formed by recesses which are distributed around the circumference and are approximately quadrantal, located in the hollow-cylindrical section of sealing housing 23', which projects beyond housing 45 of the secondary seal, as well as in the radially external part of the annular rib 37. An air conduit tube 49 surrounds cooling ribs 35d, beginning on the exposed end of the sealing housing, for a portion of their axial extent and projects beyond this end face. A fan wheel 50 is mounted inside the projecting part of air conduit tube 49, said fan wheel blowing in the axial direction and driven by shaft 4', forcing a stream C of cooling air between cooling ribs 35d, with said stream of cooling air emerging nearly radially with respect to the sealing housing.

Figure 3:
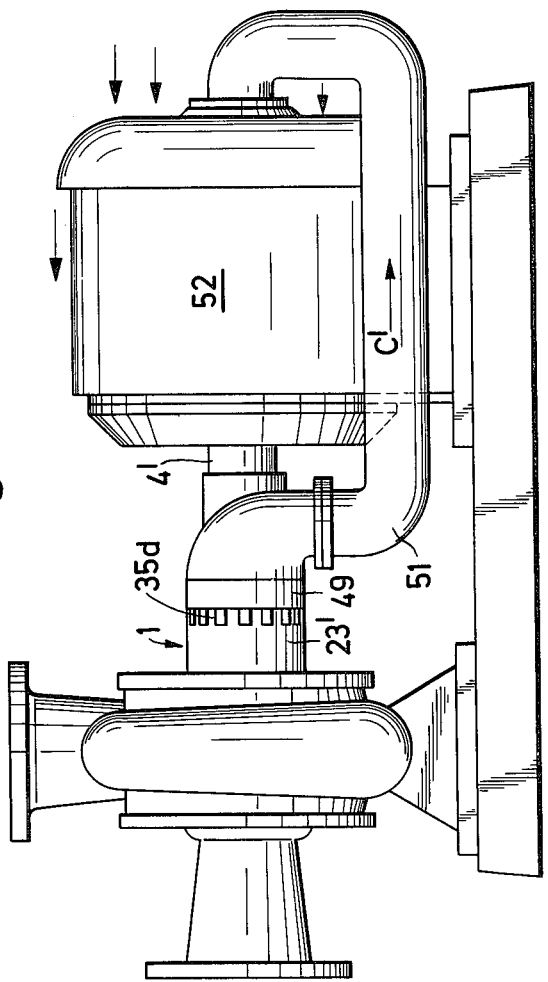
FIG. 3 is a side elevation of a pump driven by an electric motor and equipped with the mechanical seal according to the FIG. 2 embodiment of the invention with a modified air circulation system and being in connection with the cooling air system of the electric motor.

Instead of fan wheel 50 or in addition to the latter, as shown in FIG. 3, the free end of air conduit tube 49 may be connected to a pipe 51, which is connected in turn with the cooling air system of an electric motor 52 driving shaft 4'. Advantageously pipe 51 is connected to the suction side of the fan of the electric motor, so that the cooling air stream C' travels opposite to the direction shown in FIG. 2. If the fan wheel shown in FIG. 2 is used as well, the latter is designed to blow in the opposite direction.

In all the embodiments, the stationary counter rings are preferably made of a material with high thermal conductivity and high strenght, e.g. tungsten carbide.

The thermal conductivity of the counter of the counter ring and of the mounting block should be at least 50 kilocalories per meter-hour-° C.

It is evident that those skilled in the art, once given the benefit of the foregoing disclosure, may now make numerous other uses and modifications of, and departures from the specific embodiments described herein without departing from the inventive concepts. Consequently, the invention is to be construed as embracing each and every novel feature and novel combination of features present in, or possessed by, the apparatus and techniques herein disclosed and limited solely by the scope and spirit of the appended claims.

What is claimed is:

1. A cooled mechanical seal assembly for a shaft passing from the free atmosphere through an opening in a housing wall, comprising,
means defining a primary seal slide ring with a front working surface rotating together with the shaft.
means defining a primary seal counter ring and a sealing housing with said counter ring being mounted in said sealing housing, the sealing housing containing a medium to be sealed and wherein the counter ring is exposed to the medium to be sealed and is fastened so as to be axially non-displaceable and prevented from rotation in the sealing housing and essentially has a front face and peripheral and rear outer faces, means for spring-forcing a front working surface of the slide ring against said counter ring front face, and further comprising, means defining a mounting block portion of said sealing housing supporting said counter ring and comprising extension of its outer peripheral surfaces open to ambient air and enlarging it in available surface area accessible to the ambient air by cooling ribs therealong, said mounting block having at least a primary inner surface in direct butting metal to metal contact against peripheral and rear outer faces of the primary seal counter ring, the primary seal counter ring having an annular shoulder defined by a front step thereof, the mounting block including a clamping flange portion with a collar end projecting regularly inwardly in annular form and resting via an O-ring gasket against said annular shoulder to seal off the annular shoulder, and wherein at least the counter ring is made of a material with high mechanical strength, whose heat transfer coefficient is greater than 50 Kcal/m h C.° means defining a secondary seal with a slide ring and counter ring on the atmosphere side of the above said primary seal and wherein said mounting block has an inner portion with back to back seats separated by an inwardly extending portion of the mounting block so that the counter rings of the primary and secondary seals are mounted immovably and face in opposite directions, the secondary seal having said slide ring secured to the shaft for rotation therewith.

2. Cooled mechanical seal in accordance with claim 1 wherein at least a portion of the said ribs project in a stellate arrangement and essentially parallel to planes containing the shaft axis from the outside circumference and the end face of the sealing housing.

3. Cooled mechanical seal in accordance with claim 2 wherein the channels between the said ribs extend from the rear face of the mounting block to its outer circumference.

4. Cooled mechanical seal in accordance with claim 2 wherein a cooling conduit at least partially surrounds the said ribs.

* * * * *